United States Patent [19]

Roest

[11] 4,126,157
[45] Nov. 21, 1978

[54] HIGH-PRESSURE FILAMENT REINFORCED HOSE HAVING INTEGRAL FILAMENT-BOUND COUPLINGS

[75] Inventor: Jan I. R. Roest, Bergschenhoek, Netherlands

[73] Assignee: Vredestein N.V., The Hague, Netherlands

[21] Appl. No.: 786,213

[22] Filed: Apr. 11, 1977

[30] Foreign Application Priority Data

Apr. 15, 1976 [GB] United Kingdom ............... 15440/76

[51] Int. Cl.² ............................................. F16L 11/08
[52] U.S. Cl. .................................... 138/109; 138/130; 285/149
[58] Field of Search ................ 138/109, 130; 156/143, 156/172, 175; 285/149

[56] References Cited

U.S. PATENT DOCUMENTS

| | | | |
|---|---|---|---|
| 2,146,218 | 2/1939 | Kimmich et al. | 285/149 |
| 2,237,490 | 4/1941 | Knowland | 138/130 X |
| 2,277,397 | 3/1942 | Graham | 138/130 X |
| 2,298,736 | 10/1942 | Harpfer | 285/149 X |
| 2,298,738 | 10/1942 | Kimmich et al. | 285/249 X |
| 2,371,363 | 3/1945 | Smith | 285/149 |
| 2,522,165 | 9/1950 | Crom | 138/130 X |
| 2,911,236 | 11/1959 | Thibault | 138/130 X |
| 3,508,768 | 4/1970 | Hogan | 285/149 |
| 3,866,792 | 2/1975 | Minke | 156/175 X |
| 3,899,006 | 8/1975 | Champleboux et al. | 285/149 X |

FOREIGN PATENT DOCUMENTS 6,702,797  9/1967  Netherlands ............................... 285/149

*Primary Examiner*—Richard E. Aegerter
*Assistant Examiner*—James E. Bryant, III
*Attorney, Agent, or Firm*—McGlew and Tuttle

[57] ABSTRACT

A pair of coupling collars are fixed on each end of a tubular mandrel. Each such collar carries a plurality of fixed bolt-hole sleeves projecting in a direction axially of the hose. Layers of rubber tape and continuous steel reinforcing cords are sequentially wound in a helical fashion on the mandrel and at the collar are brought radially out along the collar and circumferentially over at least one of the bolt-hole sleeves before passing back over the next tape layer to the other collar where the collar securing winding is repeated and so on until the required structure is built up. After the final outer tape layer is in place a split collar is placed over the hose and bolted on the inside of each of the fixed outer coupling collars to clamp the windings in place. The section is finished off by laying down tape layer seals over the area between the collars. The mandrel with its green hose section is then kettle-cured. Before shipping, polyurethane foam filled float collars of ABS are attached to the section.

In this system of installing couplings, the outer coupling collars are held in place by the tension in the continuous cords.

7 Claims, 7 Drawing Figures

——·——·—— = CONSTANT DIRECTION
—— —— —— = DIRECTION AFTER BINDING

HIGH-PRESSURE FILAMENT REINFORCED HOSE HAVING INTEGRAL FILAMENT-BOUND COUPLINGS

FIELD OF THE INVENTION

The present invention relates to a high pressure, reinforced hose of rubbery, elastic material of the type used as dredge hose, dredge couplings, dredge discharge sleeves, oil lines, petroleum lines and the like.

BACKGROUND OF THE INVENTION

High pressure hoses of rubbery material have been made by sequentially winding alternate layers of a tape of a vulcanisable rubber and of rubber-coated textile fabric and/or metal wire or cord reinforcement on a rotating mandrel, the rubber and reinforcement layers thus laid down be in cross section distinctly laminar in appearance. Such a winding procedure is not only time consuming but it is difficult to apply compact layers of rubber because not much tension can be applied to the easily stretchable tape of unvulcanized rubber.

Moreover, couplings commonly employed on this type of hose comprise an integral outer metal collar and sleeve combination, the sleeve portion of which is built into the internal end bore at each end of the hose section during manufacture. Outer compressive bands or clamps are placed over each end of the hose in the region of the sleeves to assist in retaining the sleeves under internal pressure. Axial forces on the hose are transferred to the couplings and in the existing hose these forces are taken up largely by the outer compression bands. Hose of this construction to be used as dredge discharge sleeves (connector between dredge and floating dredge line) or as floating dredge lines per se require that the internal bore of the sleeves be lined with rubber to resist abrasion. Such lining must be applied by hand in a difficult operation, especially in the smaller hose sizes, at significant expense. Such dredge hoses under favorable service can carry a nominal pressure (burst) rating of 50 to 57 atm. But under unfavorable or severe service conditions, the combination of high internal pressure, and especially of high transient internal pressures exceeding the pressure rating, with twisting, extension and shearing forces exerted at the couplings tend to expel the coupling sleeves. When this happens, dredging must be terminated while the damaged discharged sleeve or hose section is replaced. Also the damaged section usually must be sent back to the manufacturer for repair. Under these conditions the maximum allowable working pressure of the hose may be as low as 20 atm. or less, whereas the hose body can easily be built to withstand much higher pressures.

Floating dredge hoses of rubber are now made having externally applied flotation collars so as to float without the usual pontoon supports. The action of tides, winds and waves on such floating lines often impose very severe strain on the couplings which sometimes fail at an unacceptable rate. These problems plus a tendency for dredging pressures to increase require significantly improved hose incoporating improved couplings.

SUMMARY OF THE INVENTION

The present invention provides both an improved high pressure hose having integral metal couplings bound to a pattern of continuous filamentary reinforcements extending throughout the hose body and a method of manufacturing such hose.

According to the present invention there is provided a high pressure hose having a body wall of rubbery material reinforced with windings of filamentary reinforcement and a coupling member at each end for assembly in use, wherein each such winding comprises a plurality of continuous lengths of said filamentary reinforcement arranged in a band-like grouping in side-by-side spaced disposition, with each such grouping being disposed helically with respect to the axis of the hose and extending back and forth successively through the body wall in successive runs at equal but opposite angles with respect to such axis. The said band-like groupings of filamentary reinforcement are secured mechanically to the coupling members at peripheral locations thereon which are physically outside of the circumference of the hose body, and the portions of said windings at the coupling locations are clamped and sealed by rubbery material to the respective coupling member.

Preferably, each of the couplings comprises an outer collar and an inner collar with one of the outer collars carrying a plurality of winding-retaining means arranged in a circle outside of the body of the hose, each of the band-like winding groupings being brought outwardly at each of its ends from the body of the hose to the winding retaining means at the same peripheral location with respect to the circumference of the hose body, and the collars at each end of the hose being clamped over the collar-engaged ends of the windings by a compressive force exerted in a direction parallel to the axis of the hose.

Further, each of the couplings preferably comprises an outer and an inner collar with the outer collar having a plurality of winding-retaining projections arranged equidistantly in a circle outside of the hose body wall and extending in a direction parallel to the axis of the hose, each end of each successive run of the band-like groupings of filamentary reinforcement being passed over the peripherally-corresponding winding-retaining projection at each coupling, and the band-like groupings of filamentary reinforcement being arranged in successive complete passes back and forth through the body wall with each successive complete pass being indexed over the peripherally-successive winding-retaining projections at each coupling collar to form a balanced filamentary reinforcing structure Each of the inner collars preferably has its inner periphery shaped to provide a smooth transition of the band-like winding groupings from the circumferential to the outward direction and its outer periphery shaped to form a recessed bundle of rubber-encased windings over each of said collar projections.

In the high pressure hose according to the present invention, each said coupling member preferably comprises an outer collar carrying a plurality of bolt-hole sleeves rigidly secured thereto and arranged equidistantly in a circle outside of the hose body wall and extending in a direction parallel to the axis of the hose, the band-like winding groupings being passed back and forth through the body wall in complete passes with each end of each pass passing over the bolt hole sleeve at the same peripheral location at each coupling, and the outer and inner collars of each coupling being secured together by bolts passed through the sleeves and exerting on the sleeve-engaged windings a compressive force exerted parallel to the axis of the hose.

The hose of the present invention has a network of numerous filamentary reinforcements helically disposed to the axis of the hose, which reinforcements are continuous in character in the sense that each individual strand thereof passes back and forth through the body of the hose a plurality of circuits or passes with each of such passes mechanically engaging the coupling member at each end of the hose, and with the coupling engagements of successive passes being circumferentially progressively and regularly advanced about the coupling to form a balanced structure in which longitudinally exerted forces tending to separate the couplings from the hose body are taken up largely by tension in the filamentary reinforcements. A "circuit" or "pass" in the sense used herein is a band of reinforcements comprising a plurality of continuous filamentary reinforcements which can be considered to extend from its point of engagement with a first coupling or coupling member through the hose body at one helix angle to the other coupling at the corresponding circumferential engagement location there on and return through the body at an equal but opposite helix angle to the first collar at the predetermined circumferential engagement location thereon. The hose of the invention has a reduced tendency to twist in service due to its highly balanced filamentary pattern. The coupling engaged windings are clamped to each coupling by clamping means exerting a compressive force directed only longitudinally of the hose parallel to the axis and the resulting structure is vulcanised in place on the mandrel to produce a hose of solid reinforced rubber having integral filament bound couplings. After vulcanization there is in the hose of the invention very little, if any, residual tension in the pattern of filamentary reinforcement.

According to the present invention there is also provided a method of making hose of a rubbery material having filamentary reinforcement and a coupling at each end for assembly in use, which comprises, mounting a pair of coupling members in spaced-apart relation on a rotatable mandrel, each coupling having a plurality of circumferentially disposed winding-retaining means carried above the surface of the mandrel by a distance exceeding the thickness of the hose to built thereon, rotating the mandrel while applying thereto a composite winding including one above the other a layer of a rubbery tape and a plurality of continuous lengths of filamentary reinforcement arranged in side-by-side spaced relation to form a band, translating the point of application of said composite winding back and forth along the length of said mandrel between the coupling members mounted thereon to generate thereon a winding in one direction of travel at a helical angle with respect to the axis of rotation and at an equal and opposite helical angle in the return direction, the point of application of the composite winding being brought repeatedly over each coupling member to cause the composite winding to engage at least one winding-retaining means thereon and the rotation of the mandrel being indexed with respect to the translational movement of the composite winding to cause the composite windings to engage circumferentially successive winding engaging means on each round-trip pass of the composite winding, after the requisite thickness of windings have been so applied clamping the coupling retained ends of the windings to each coupling, and vulcanizing the resulting assembly in place on the mandrel.

Preferably, the added steps of winding a layer of rubbery tape only over the built-up body of composite windings to form an outer skin of rubbery material thereon and then clamping the coupling retained ends of all windings to the couplings and vulcanizing the resulting assembly in place on the mandrel, are included.

The outer collar of each coupling member may further be mounted on the mandrel as described and carry a plurality of winding-retaining means arranged equidistantly in a circle on a radius exceeding that of the hose to be built thereon, and the outer and inner collars of each said coupling member may be clamped together over the collar-engaged ends of the composite windings before the vulcanizing step.

In one embodiment of the present invention, the composite winding is a band of continuous monofilamentary metal wires located above with respect to the rubbery tape and signficant tension is applied only to the band of wires during the winding.

A layer of rubbery tape may be wound onto the mandrel both before and after the composite windings are applied.

In a further embodiment of the method of the present invention an added short reciprocatory motion is imparted to the winding supply in the region of each coupling so as to apply an extra winding between each helical pass, each such extra winding including an elliptically-shaped loop between each coupling winding engaging means carrying helical windings and a portion of the mandrel surface adjacent each coupling.

The method of the present invention produces such a hose by a winding technique utilizing a composite winding comprising a rubbery tape and a band of reinforcements comprising a plurality of continuous lengths of filamentary reinforcements arranged in a flat band and simultaneously wound on a rotating mandrel. A pair of coupling members are mounted in spaced-apart relation on such mandrel. Each such coupling member has a plurality of circumferentially-disposed winding engaging means which extend longitudinally parallel to the axis of the mandrel and are peripherally equidistant one from the other and located radially with respect to the mandrel outside of the body of the hose to be generated thereon.

The composite winding is created by bringing together a continuous length of a rubbery tape from a supply reel and likewise a plurality of continuous lengths of filamentary reinforcements arranged in spaced-apart relation as an essentially flat band. Preferably, the filamentary reinforcements are applied to the mandrel simultaneously with the rubbery tape. While either the tape or the band of filaments can be uppermost, there is a signficant advantage to the filaments being above the tape so that a significant tension taken only on the filaments during winding compresses the tape as it is applied. Windings thus applied stay in position more precisely on the mandrel and produce a tighter and more coherent mass of windings.

Winding starts by temporarily securing the end of the composite winding to one of the collar bushings, passing the starting winding under moderate tension downwardly to the mandrel surface where it is wound thereon as a helical progressing to the other end of the mandrel to a similar outer collar. The winding is brought outwardly and is passed circumferentially over one or more bolt hole bushings and from thence back down to the mandrel surface where it is wound thereon in a winding of equal but opposite helical angle to the initial run of windings and progressing back to the original or first collar. Retainer fingers or clips on the ends of the bushings temporarily retain the windings.

The winding step proceeds by translating the winding feed point or supply back and forth in a reciprocating motion over the surface of the mandrel defined by the coupling members. The mandrel is rotated and the rotation of the mandrel and the lineal rate of translation of the winding supply along the mandrel are synchronized so as to generate on the surface of the mandrel, in one direction of travel of the winding supply, a composite band-like winding oriented at the desired helical angle with respect to the axis of the mandrel and, in the other direction of travel, a composite band-like winding at an equal but opposite helical angle.

During the winding, the winding supply or feed point is brought at each end of its path of reciprocating travel over or adjacent to each coupling member so that the composite winding "picks up" a winding engaging means on the coupling member. In each complete back and forth "pass" of the windings, the pass starts and ends at the corresponding peripheral locations on both coupling members. The winding then procedes by indexing the next peripherally adjacent pair of winding engaging means until all such means have been picked up and equal number of main helical windings and a circumferentially balanced pattern of windings of the requisite thickness has been built up on the mandrel.

At the latter point in the procedure, it is usual to sever the reinforcements and continue the winding procedure with tape only to generate a rubbery outer skin on the hose body and over the windings on the couplings.

The process of the invention then involves a step of applying a clamp around the coupling engaged ends of the continuous windings and the procedure is continued by vulcanizing the thus assembled structure in place on the mandrel. The last step is to remove the mandrel from inside the hose body to obtain the finished hose.

In such hose there is very little, if any, residual tension in the pattern of filamentary reinforcement but the couplings are firmly and integrally bound to the filamentary pattern of reinforcements in the hose body. Forces exerted on the couplings in service tending to separate the couplings from the hose body are taken up by tension in the reinforcements and which forces, due to the helical nature of the windings, are translated largely longitudinally of the hose as opposed to radially.

Preferably, the hose structure and method of the present invention can be modified by applying extra short windings in the region of the couplings to stiffen the ends of the hose and strengthen the attachment of couplings to the hose body. Such extra windings can be interposed between each helical pass or between each of a selected number of helical windings.

The procedure involves the interposition of a series of short reciprocatory motions of the winding feed in the region of each coupling, preferably so as to "throw" an elliptically-shaped loop of winding between each winding engaging means on the coupling and around a portion of the periphery of the mandrel adjacent each coupling. Each winding engaging means on each coupling carrying helical windings is thus given a loop before the next helical run of the pass is continued. By definition an "extra winding" in this sense at each coupling member thus includes at least a number loops equal to the number of winding engaging means carrying helical windings.

A convenient way of applying these extra windings is to start the extra winding at one of the bolt hole bushings and pass it down to the circumference of the mandrel in an elliptical winding and back to the same bushing with the extra windings being then advanced in progression around the circle of bushings until an appropriate number and distribution of bushings have received an extra winding. As each main helical body winding is applied an extra winding can be wound on engaging the bolt hole bushing in a suitable radial progression.

BRIEF DESCRIPTION OF THE DRAWINGS

The present invention will now be further described by reference to the accompanying drawings, in which.

DESCRIPTION OF THE PREFERRED EMBODIMENT

Figure 1:
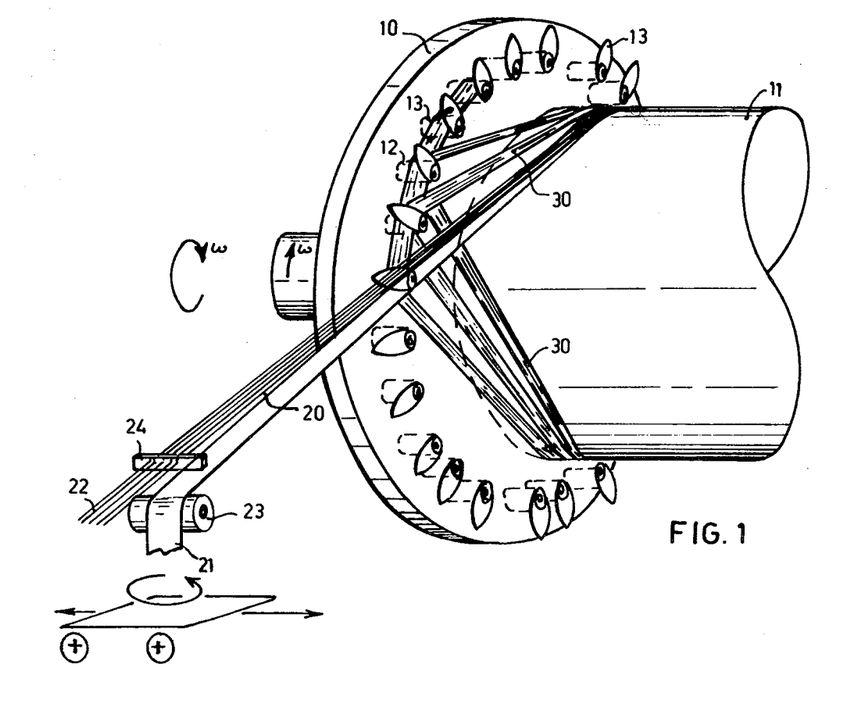
FIG. 1 is an isometric side view of one end of a winding mandrel on which the hose of the present invention may be wound, the view showing how a rubber tape and a band of continuous filamentary reinforcing are brought together and simultaneously wound on the mandrel, a coupling member in the form of a collar mounted on the mandrel and having a circle of bolt hole bushings each carrying a winding pick-up finger or clip to serve as winding engagement members, how the windings of each winding pass are applied at equal and opposite helix angles, and how, in the embodiment illustrated, each pass of the windings engages a number of bolt hole bushings.
Figures 2, 3:
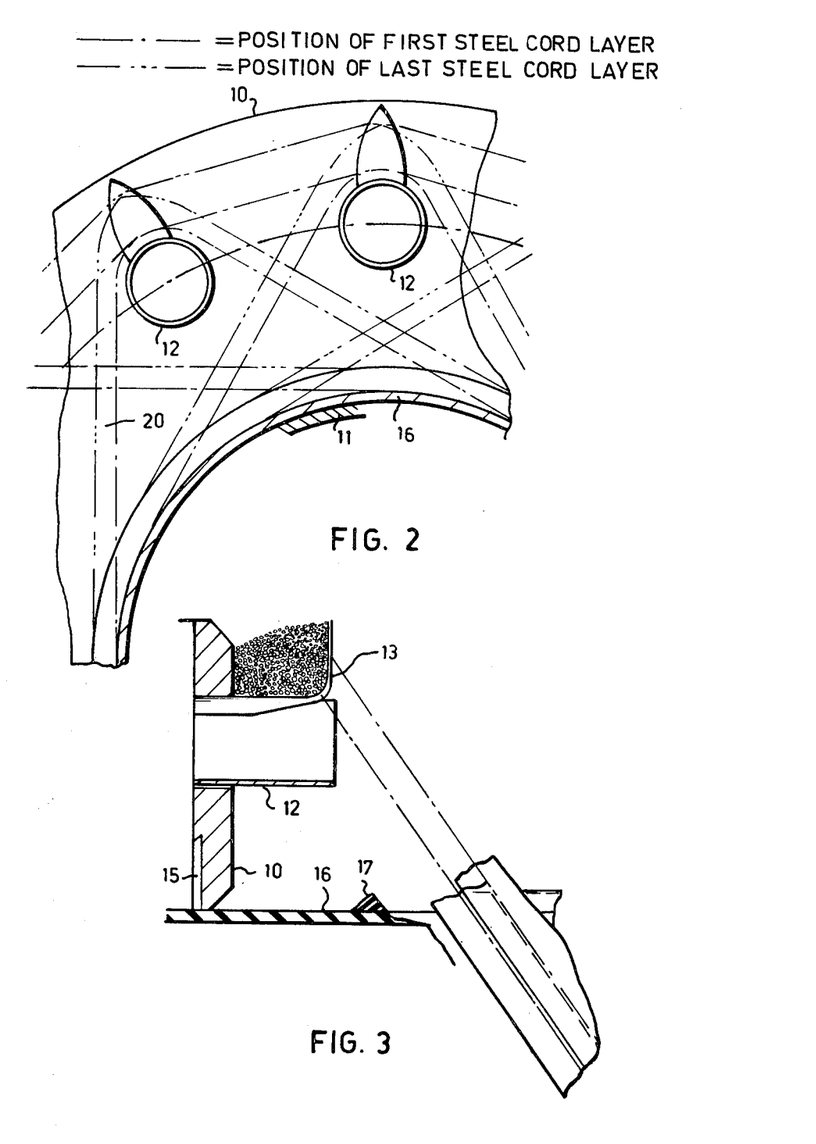
FIG. 2 is a partial sectional end view taken diametrically through the mandrel of FIG. 1 just inside of the coupling collar, the view showing the shape of the winding retainer fingers carried by the bolt hole bushings and in dash-dot lines how each successive composite winding engages successive bolt hole bushings.
FIG. 3 is a view showing a section through a completed bundle of windings over one bolt hole bushing.

Referring now to FIGS. 1, 2 and 3 the manufacture of the hose according to this invention starts by mounting and securing a pair of outer collars 10 (only one shown) in spaced - apart relationship on a cylindrical rotatable winding mandrel 11. The collars 10 preferably are continuous collars rather than the split variety. Each collar 10 has a plurality of bolt hole bushings 12 swaged into a circle of bolt holes. Such bolt holes, it should be noted, are peripherally equidistant one from the other and located in a circle at a radial distance above the mandrel surface which is beyond the thickness of the hose to be built thereon.

Figure 7:
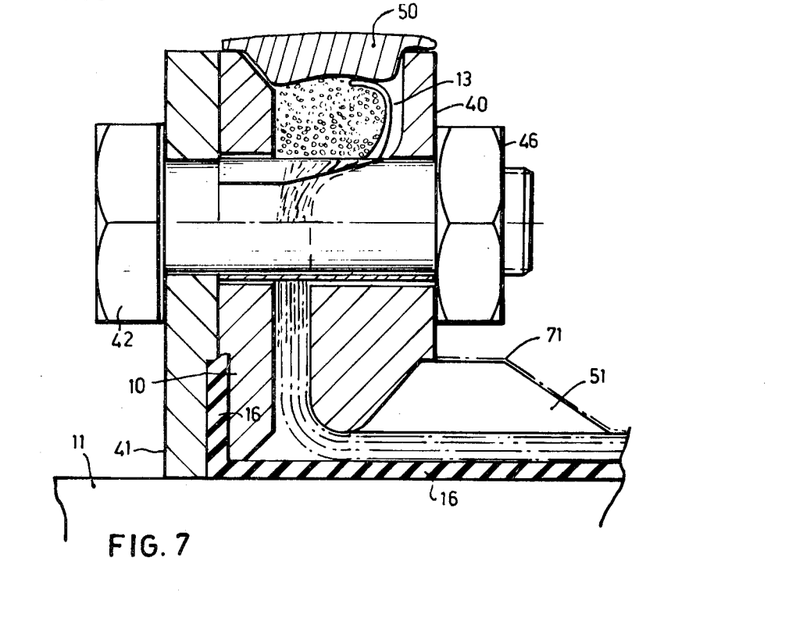
FIG. 7 is a view similar to that of FIG. 6 but showing the completed winding assembly in place, a face plate and the bolts in place and tightened, an outer collar seal applied, and the assembly as vulcanized showing coalescence of the windings on the collars to an integral bundle of solid filament reinforced rubber.

Each of the bolt hole bushings 12 is provided with a retainer clip or finger 13 of retatively thin crushable sheet metal or plastic and which is swaged into the bolt hole along with the bushing 12. The outer upper end of each finger or clip 13 is tapered in a two-sided arc coming to a point to allow windings to slide smoothly into place over the bushing and avoid interference with the winding leaving the bushing. A facing 14 (FIG. 4) of unvulcanized rubbery material is adhered to the inner surface of each of collars 10 in their winding contacting areas. Each collar 10 also has a recessed circle 15 on its outer surface into which a circular sheet of rubber 16 (see FIG. 7) is fitted after winding is completed. As will be noted, rubber sheet 16 is laid on the surface of mandrel 11 and collars 10 are installed thereover so as to have their inner peripheries coated with rubber not only as a pressure seal but also to protect the metal of the collars against abrasion. Lastly, an extra breaker band 17 of triangular shape and composed of unvulcanized hose body stock is applied over sheet 16 just ahead of each collar 10 to fill the gap between the reinforcements and outer collar.

As is shown in FIG. 1, a composite winding 20 is formed by bringing together a strip or tape 21, for example 200 mm wide by 1.5 mm thick, of a vulcanisable hose body rubber composition and a plurality of individual wires, filaments or cords 22 from suitable supply spools (not shown), the tape 21 being brought over an idler roll 23 and the wires 22 being brought first to a slotted comb-like guide element 24 having an individual slot for each wire 22. As few as two to as many as 100 or more of wires 22, more preferably between 6 and 50 (e.g. 20 to 50) wires 22, are thus brought together in uniformly spaced-apart relationship to form a flat band of wires. The tape 21 and the band of wires 22 converge until the wires 22 are laid on the top surface of the tape 21 and may be at least loosely adhered there to by the natural surface tack of unvulcanized rubber. Such composite winding 20 thus formed will usually carry from about 4 to about 20, for example from about 4 to 8, wires per centimeter of its width.

The winding procedure usually begins either by applying a continuous sheet 16 of rubber over the surface of the mandrel by hand lay-up procedure or by winding the rubber tape on the mandrel until the requisite thickness 16 of rubber is built up. In either case, the collars 10 are then installed and aligned on the mandrel 11 with their bushings 12 in alignment. The triangular breaker band 17 of unvulcanised rubber will be applied over sheet 16.

The winding procedure then continues by securing the end of composite winding 20 to one of the bolt hole bushings or sleeves 12, for example by wrapping the winding several times around the sleeve and/or by forcing the end thereof inside the end of one of the sleeves. A very significant tension is taken on each wire portion of the composite winding 20, for example, a force of one to four kilograms with the lower tension used if the tape is warm and the higher tension if the tape is cold. The mandrel is then put into rotation while simultaneously the winding feed is translated down the length of the mandrel towards the other collar 10. The rate is rotating the mandrel 11 and the lineal rate at which the winding 20 is moved or translated down the mandrel must be synchronised so as to generate a band-like winding 30 on the mandrel 11 (see FIG. 1) of the correct helical angle with respect to the axis of rotation. No means for doing this is shown since both filamentary winding techniques and filamentary winding machines embodying the requisite controls are equally well known and, morever, the machine forms no part of the present invention. The winding procedure can be carried out manually by a skilled operator.

When the composite helical winding 30 reaches the region of the opposite collar 10, the winding 20 is picked up by one of the fingers 13, which directs it over the associated bolt hole sleeve 12. The direction of translation of the composite winding 20 then is reversed and winding then progresses back towards the first collar 10 laying down the second half 30 of the complete pass at an equal but opposite helical angle. At the first collar the winding is picked up and passes over the same bushing on sleeve 12 from which the round trip pass originated. Winding then continues with a peripherally successive pair of bushings 12 being indexed for each pass. The peripheral indexing of successive passes produces a natural slight overlap of the edges of each pass.

As appears in FIG. 3 a great many such passes engage each of the bolt hole bushings 12.

While the winding procedure can employ any reasonable helix angle, it is greatly preferred to employ an angle of 53° to 55° (e.g. about 54°) with respect to the axis of rotation since such an angle is most efficient in translating radially expansive forces to longitudinally directed tensional forces in the wires 22. It should be noted that, as originally applied, the windings in the region of the collars 10 describe an appreciable angle "A" (see FIG. 4) with respect to the longitudinal surface of the mandrel 11. As will be seen later on, such angle is considerably increased when an inner collar is attached and the windings clamped between the collars. The increase in angle can be seen by comparing FIG. 4 with FIG. 6 where the outer collars are shown to move toward each other under clamping action.

Figure 5:
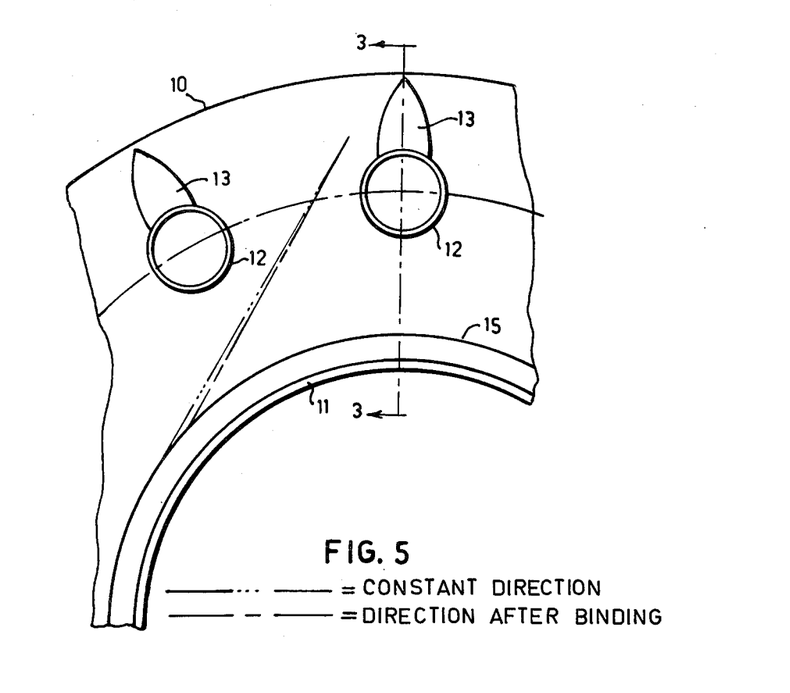
FIG. 5 is a partial end sectional view similar to that of FIG. 2 showing in dash-dot lines how the direction of the windings is changed by rope winding on the reinforcements.

It should also be noted that both the structure of the hose and the procedure of the present invention may be modified so that each pass of the helical windings engages only one bolt hole sleeve 12 (as is shown in FIGS. 2 and 5) or each pass can engage 2 or more bolt hole sleeves 12, as is shown in FIG. 1. When each winding passes over a plurality of sleeves 12, the "bundle" of windings becomes larger as the number of sleeves included in each pass is increased. It is thus necessary to provide coupling collars having numbers of winding engaging means (i.e. sleeves 12) somewhat conditioned on the thickness of the hose body to be generated and to engage each winding pass with a selected number of such engaging means or sleeves 12 to provide a bundle of windings which can be recessed between the collars. However, a given collar design can be employed on hoses of a range of thicknesses by varying the number of sleeves engaged by each pass or even by skipping sleeves on collars having too nummerous and closely-spaced sleeves.

It also will be appreciated that, at the completion of the winding procedure, the filamentary pattern generated in the hose body is not laminar as in prior art hoses built by sequentially applying reinforcing and tape layers. Rather the filamentary pattern is criss-crossed so frequently that in section the filamentary dispersion in the vulcanised hose appears almost randomly uniform, see the section through the bundle in FIG. 7. Moreover, since each winding pass contains a plurality of continuous filaments all of which are secured to each respective winding engaging means on each collar, breakage of one or more of the individual filaments or wires in the same pass has a relatively minor effect on the strength of attachment of the couplings.

After the requisite thickness of composite helical windings 30 has been built up on the mandrel surface, the filaments or wires 22 are severed, the wire ends thus obtained secured to a winding engaging means to tie it down and the winding of tape only continued to build up a rubbery outer skin on the hose of the desired thickness.

Figure 4:
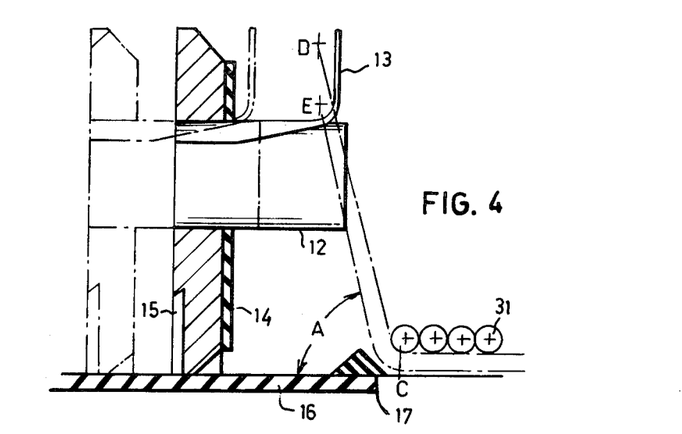
FIG. 4 is a partial sectional side view through the coupling collar and mandrel, the view showing the shape of the strand-retaining fingers, the bolt hole bushing, a rubber facing adhered to the strand-contacting portion of the inner collar face, a rubber breaker of triangular shape applied to the surface of the mandrel just inside the collar, the inward movement of the outer collar, which is the result of helically turns of a rope winding under tension at the reinforcements starting at a point where the reinforcement is leaving the mandrel and ending when the angle A has reached 75° ($A = 54°$ before rope applied).

The tape only winding is also applied to the outside of each outer collar 10 to fill the circular recess 15 with solid rubber. The rotation of the mandrel is then stopped. The installation of the inner collar can be facilitated by wrapping a rope or cable 31 tightly around the finished windings at each end of the hose and adjacent the triangular breaker strip 17 (FIG. 4). A number of tightly wrapped turns 31 of rope causes the outer collars 10 to move inwardly increasing the angle of the windings passing over the sleeves 12 somewhat and inducing sufficient slack in the windings to admit the inner collar. Subsequently the wrappings 31 are removed and an inner collar 40, in this case most conveniently of the split variety, is mounted over the mandrel 11 inside each outer collar 10. A collar-shaped face plate 41, also of the split variety, is then placed over each end of the mandrel 11, outside of the outer collar thereon, and bolts 42 inserted through the face plate 41, the outer collar 10, and inner collar 40.

The bolts 42 and nuts 46 are then uniformly and gradually tightened. Note in FIG. 4 how the rope wrappings 31 cause inward movement of the outer collars 10 and, in FIG. 6, how the collars 18 are moved still further inward towards each other. The fingers 13 are crushed by the clamping action of the collars. As will be seen also in FIG. 6 the inner collar 40 has a facing 43 of unvulcanised rubber on its winding contacting surfaces, for example adhered by a good adhesive to prevent filament-collar contact and insure a better seal of the winding bundles. Note also in FIGS. 6 and 7 how the inner peripheral corner 44 of inner collars 40 is gently rounded to avoid kinking of the filaments 22. The inner periphery of each inner collar 40 is angled sharply away from the rounded peripheral corner 44 to form a collar anchor surface 45, the purpose of which appears below. The outer peripheral portions 46 of inner collars 40 are thinner than the inner peripheral portions to provide room for a recessed bundle of windings. The inner collar has a certain profile designed for the following reason:

FIG. 4 shows the length and direction of the first (C–E) and the last (C–D) reinforcement layers.

Figure 6:
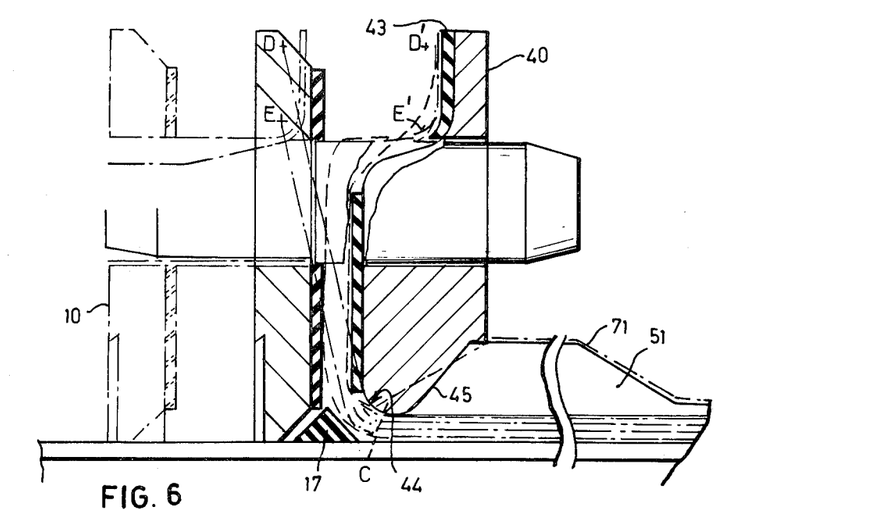
FIG. 6 is a view similar to that of FIG. 4 but with an inner clamping collar in place, the view showing how the inner collar is similarly provided with a rubber facing on its winding contacting face and how the inner periphery of the inner collar is shaped to encourage a smooth transition from the horizontal helical winding to the outward direction.

The length of these two layers is shorter than the length of the layers in FIG. 6, length CD' and CE'.

By completing the assembly of the end coupling members the wires of the reinforcement layer will be stretched. Any wire will be stretched. By vulcanising the hose any wire of the reinforcement layers will become without any stretch. Thus by a hose in service any wire of the reinforcement will carry over the same tensile load to the coupling.

After completing the assembly of the end coupling members, tape only winding is resumed to build up an edge seal 50 (FIG. 7) between each pair of collars 10, 40 and a thickened rubbery band or anchor 51 encasing each inner collar 40 anchor surfaces 45. Anchor 51 may also be an extruded strip. The thickness of the resulting rubbery anchor 51 helps hold the coupling, spreads the load imposed by twisting at the couplings and increases sealing of the inner collars 40. The hose structure is now complete.

The next step in the procedure is, winding nylon tape 71 around the assembled hose with a large pitch. This will be done two times. After winding the nylon tape, a rope is coiled on the assembled hose with a certain force to make a body for free vulcanisation. Now the completed hose structure is vulcanized in place on the mandrel. This is usually done by placing the mandrel and the assembled hose in a hot air oven or in an open steam autoclave. The vulcanization is carried out at any temperature conventionally employed ranging from 150° to 225° C.

The last step is to remove the mandrel from the hose after the assembly has cooled.

In the hose of the present invention, the couplings are an integral part of the hose and are retained by tension in the wire reinforcement layers. The hose of this invention retains its couplings at any pressure up to 75 atm. or more which the hose body can be built to withstand. An experimental hose of i.d. 200 mm. built by the method described failed in the hose body at 50 atm. due to a defective cord angle in a portion of the body but the couplings held.

The hose of the present invention can be built of any rubbery material but preferably is built employing an unvulcanized tape made of a vulcanisable rubbery material based on any of the natural and/or synthetic rubbers. Synthetic rubbers which may be thus utilised are SBR, cis-polybutadiene, cis-polyisoprene, the oil-resistant synthetic rubbers such as neoprene and the butadiene/acrylic nitrile ("nitrile copolymer) rubbers, EPDM terpolymer (ethylene/propylene/diene) rubbers, butyl rubber, and many others. The rubber of the tape may be compounded by conventional techniques for the properties needed in the hose. It may be desirable to employ tapes of different rubbery composition in the various parts of the hose, for example, the tape only winding first applied to the mandrel surface can be of a special high abrasion composition or of an oil-resistant rubber composition whereas the tape employed in composite internal windings can be of a softer or tackier formulation having good flow or knitting action during vulcanisation and the tape only windings applied as the outer skin of the hose can be specially formulated of degradation-resistant or weather-resistant butyl or EPDM rubbers.

The reinforcement employed in the hose and method of this invention can be any filamentary reinforcement ranging from mono-filaments or monofilamentary wires or braided or twisted multi-filamentary cords of naturrally-occurring fibers, synthetic fibers, plastic or metals of many kinds. Metal reinforcements are preferred, and most preferred are mono-filamentary forms of iron and steel wire. The filamentary reinforcement, whatever its form and composition, is also preferably surface treated to increase its adhesion to rubbery materials as is well-known good practice in rubber technology. The filamentary reinforcement may be encased in or pre-coated with rubbery material before its incorporation in the composite windings of this invention. Most preferred reinforcing material is bare mono-filamentary wires of steel which have a brass plated coating for good adhesion to the rubber.

The hose as described may be built using any filamentary type of reinforcement including any metal wire or braided metal wire cord reinforcement members, rayon, nylon, aramide, polyester, glass fiber, etc. The reinforcements can be monofilamentary in character or may be braided as a cord. Un-braided metal wires of iron or steel are preferred. The surface of the metal on the reinforcement is preferably treated for good adhesion to rubber as is conventional in metal reinforcements in rubber articles, e.g. radial steel auto and truck tires. The wire reinforcing members may be applied to the mandrel either with or without a rubber coating on the metal but it is preferred to use bare wire.

What is claimed is:

1. In a high pressure hose having a tubular body wall of rubbery material internally reinforced with windings of filamentary reinforcement, and a coupling member at each end for assembly in use, the improvement comprising, in combination, each coupling member having a portion projecting radially outwardly of said body wall; each winding being constituted by a plurality of continuous lengths, of said filamentary reinforcement, arranged side by side in laterally spaced relation to form a band-like grouping; each grouping extending helically, relative to the axis of said hose, through said body wall as a plurality of integrally continuous successive runs between said coupling members, with consecutive runs extending at equal but opposite angles with respect to said axis; means mechanically securing each grouping, at the reversal points between integrally continuous consecutive runs, to both coupling members at peripherally spaced coupling locations on said coupling members, which locations are spaced radially outwardly of the outer periphery of said body wall; and rubbery material clamping and sealing each grouping to both coupling members at said coupling locations.

2. A high pressure hose, as claimed in claim 1, in which each coupling member comprises an axially outer collar and an axially inner collar, with one of said collars having a plurality of winding-retaining means disposed radially outwardly of the outer periphery of said body wall in circumferentially spaced relation in a circle; each band-like grouping extending outwardly, at each of its reversal points, from said body wall into engagement with said winding-retaining means, with the two reversal points of each run engaging respective winding-retaining means, on each coupling member, which winding-retaining means have the same circumferential location with respect to the circumference of said tubular body wall; the collars at each end of said hose being clamped over the collar-engaging reversal points of each grouping by a compressive force exerted parallel to the axis of said hose.

3. A high pressure hose, as claimed in claim 1, in which said filamentary reinforcement is a metal reinforcement and said rubbery material is a vulcanized rubber composition.

4. A high pressure hose, as claimed in claim 2, in which said plurality of winding-retaining means comprise respective winding-retaining projections on each outer collar, said projections extending axially inwardly parallel to the axis of said hose; whereby each band-like grouping forms a balanced filamentary reinforcing structure for said tubular body wall.

5. A high pressure hose, as claimed in claim 4, in which said filamentary reinforcement is constituted by mono-filamentary steel wires, said rubbery material being a vulcanized rubber composition.

6. A high pressure hose, as claimed in claim 4, in which each inner collar has a radially inner periphery shaped to provide a smooth transition of each band-like grouping from the circumferential direction thereof to the radially outward direction thereof; the outer periphery of each inner collar being shaped to form a recessed bundle of rubbery material sealed windings over each of the associated winding-retaining projections.

7. A high pressure hose, as claimed in claim 1, in which each coupling member comprises an outer collar formed with a plurality of bolt holes spaced radially outwardly of said tubular body wall and arranged at equi-angularly spaced locations in the circumference of a circle; respective bolt-hole sleeves secured in each bolt-hole and extending axially inwardly parallel to the axis of said hose; each band-like grouping, at its reversal points, extending over respective bolt-hole sleeves, with the reversal points at the opposite ends of each run of the grouping engaging bolt-hole sleeves, respective to each outer collar, at the same peripheral location; each coupling member further including an inner collar formed with bolt-holes alignable with the bolt-holes of said outer collar; and bolts extending through the bolt-holes of each inner and outer collar and exerting on the portions of the winding engaged by said collars, a compressive force extending paralle to the axis of said hose.

* * * * *